United States Patent
Gupta et al.

(10) Patent No.: US 7,412,524 B1
(45) Date of Patent: Aug. 12, 2008

(54) METHOD AND SYSTEM FOR AUTHENTICATION WHEN CERTIFICATION AUTHORITY PUBLIC AND PRIVATE KEYS EXPIRE

(75) Inventors: Deepak Gupta, Delhi (IN); Vamsavardhana Reddy Chillakuru, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 1723 days.

(21) Appl. No.: 09/626,637

(22) Filed: Jul. 27, 2000

(51) Int. Cl.
*G06F 15/16* (2006.01)

(52) U.S. Cl. .................. 709/229; 713/155; 713/157; 713/158

(58) Field of Classification Search ............. 713/157, 713/156, 158, 175, 155; 380/30; 709/229
See application file for complete search history.

(56) References Cited

U.S. PATENT DOCUMENTS

| | | | |
|---|---|---|---|
| 5,175,765 A | 12/1992 | Perlman | |
| 5,241,599 A | 8/1993 | Bellovin et al. | |
| 5,978,918 A | 11/1999 | Scholnick et al. | |
| 6,044,462 A | 3/2000 | Zubeldia et al. | |
| 6,076,163 A | 6/2000 | Hoffstein et al. | |
| 6,094,485 A * | 7/2000 | Weinstein et al. | 380/30 |
| 6,230,266 B1 * | 5/2001 | Perlman et al. | 713/158 |
| 6,233,565 B1 * | 5/2001 | Lewis et al. | 705/35 |
| 6,324,525 B1 * | 11/2001 | Kramer et al. | 705/40 |
| 6,367,009 B1 * | 4/2002 | Davis et al. | 713/166 |
| 6,373,950 B1 * | 4/2002 | Rowney | 380/255 |
| 6,668,322 B1 * | 12/2003 | Wood et al. | 713/182 |
| 6,775,772 B1 * | 8/2004 | Binding et al. | 713/171 |

FOREIGN PATENT DOCUMENTS

| | | |
|---|---|---|
| JP | 09-261218 | 10/1997 |
| JP | 10-020779 | 1/1998 |
| JP | 10-051442 | 2/1998 |
| JP | 2000-49766 | 2/2000 |
| JP | 2000-059353 | 2/2000 |
| JP | 2001-344368 | 12/2001 |
| WO | WO 97/18655 | 5/1997 |

OTHER PUBLICATIONS

PCT/GB02/00308; Response to the Examiner's Communication (8 pages)—EPO.
PCT/GB02/00308; Response to the Examiner's Communication (8 pages)—EPO, date unknown.

* cited by examiner

*Primary Examiner*—Bunjob Jaroenchonwanit
*Assistant Examiner*—Kyung H Shin
(74) *Attorney, Agent, or Firm*—Schmeiser, Olsen & Watts; William H. Steinberg

(57) ABSTRACT

This invention relates to a method for enabling the use of valid authentication certificates when the public key and private keys of any of the certifying authority have expired, comprising obtaining a server certifying authority chain (SCAC) certificate by the server from the said certifying authority, presenting the original valid authentication certificate along with the said server certifying authority chain certificate by the server to the browser during the SSL handshake, accepting the transaction by the browser after verification of the original authentication certificate using the expired public key of the certifying authority, and verifying the said SCAC certificate using the new public key of the said certifying authority.

This invention further includes a system conducting secure transactions including a certifying authority for authenticating such transactions.

7 Claims, 2 Drawing Sheets

METHOD AND SYSTEM FOR AUTHENTICATION WHEN CERTIFICATION AUTHORITY PUBLIC AND PRIVATE KEYS EXPIRE

FIELD OF THE INVENTION

This invention relates to a method and system for a solution to the problems arising from the expiry of digital certificates of the certifying authority used in a secure communication environment over a public network such as the internet.

BACKGROUND OF THE INVENTION

Digital Certificates are used all over the Secure Internet world for Authentication and Data Integrity. To set up a secure Web Server, the servers request a certificate from Certification Authorities (CA). CAs are trusted third parties that are recognized and trusted by all Internet population including all Web Servers and Web Browsers. The Server Certificate is a signature by the CA that the Server has been validated by it and can be trusted. It is a signature by the CAs private key on the server's public key, its Domain Name and other information like Address etc. The self-signed Certificates of the CAs are provided in all the Servers and Browsers. So in a normal SSL Handshake between a web server and a client i.e. a Browser, when the server presents its certificate to the browser the Browser software validates the Certificate by checking the signature of the CA on the certificate with the help of the CA certificate it has.

The Problem in the above digital certificates is that the strength of the security lies in the strength of the keys used in the system. There are one pair of keys for each entity including the CA and the Web Server—the Private Key and the Public Key. Now as the CA certificates are available publicly and trusted by everyone, these keys need to be very strong and no one should be able to break them. However, this is not possible forever. Knowing the Public Key (available in the CA Certificate), with some time and money, the keys be broken. Each key has its own lifetime alter which it is assumed that it is no longer safe to use the as in that time period the keys can be broken. So the CAs expire their certificates alter some amount of time. This poses some problems as the servers using the Certificates from CAs whose certiticates expire become no longer valid (even though the servers certificates are valid i.e. not expired). Although the communication might still be secure the client throws up a message box to the user warning him that the CA has expired and it might not be a safe to transact with the server. This creates a lot of confusion for the user.

The first solution to the above problem currently is to get a new certificate for the Web server from the CA with the new CA keys generated.

The second solution to the above problem is to modify the browser software to automatically accept this connection even though the certificate has expired.

This problem was seen on 1 Jan. 2000 very much as one of the most used Verisign Certificate expired on the day and Sites using the certificates issued by the CA has to face problems as their users got an undesired pop up window from Browsers warning them of the expiration. The solution was either get the new Server Certificate from Verisign or use New versions of the Browsers. The new versions probably accepted the certificate irrespective of the date expiration. As there are a lot of CAs, each will have the same problem when their certificates expire. The users will have problems with the old versions of the Browsers, which might amount to a sizable amount of a Web Site's users. Verisign had advised users to get the newer versions of the browser.

The third solution would be to have a requirement for all CAs not to issue Certificates for period spanning more than their expiry date.

The problem with the first Solution is that it requires generating of a new Server Certificate Request, Sending it to the CA, the CA validating and signing it, sending the Certificate to the server, and finally the server importing it and making it the default Certificate. This amounts to a lot of rework, in fact requires the entire process of Certificate generation to be done again.

The problem with the second solution is that it will work only with the newer versions of the Browser software thereby cutting a sizable amount of the Internet Population. Generally while dealing with Internet applications, users would not like to spend much time in downloading new software or might not like being advised of getting a new Browser. So sites might lose on some of their customers and hence some of their Business. Secondly, by accepting the expired CA, the newer versions defeat the purpose of having expired the Certificate at the first place and do pose a security threat.

The problem with the third solution is that it is practically not feasible and is not used currently. There are a lot of situations where CAs have to issue certificates for longer times. For e.g., the CA might generate keys for 2 years, after 1 year and 1 month, when an entity requests for a certificate for 1 year, the CA has to issue it for 1 year and cannot do that for 11 months and expect the user to get it reissued after that. The user will go to some other CA and the CA will lose its business.

OBJECTS AND SUMMARY OF THE INVENTION

The object of this invention is to obviate the above drawbacks by providing a server certifying authority chain certificate (SCAC certificate), which is issued by the certifying authority using its new keys, to validate the previously issued server certificate.

To achieve the said objective, this invention provides a method for enabling the use of valid authentication certificates when the private key and public key of any of the certifying authorities have expired comprising:

obtaining a server certifying authority chain (SCAC) certificate by the server from the said certifying authority, presenting the original valid authentication certificate along with the said server certifying authority chain certificate, by the server to the browser during the SSL handshake, accepting the transaction by the browser after verification of the original authentication certificate using the expired public key of the certifying authority, and verifying the said SCAC certificate using the new public key of the said certifying authority.

The said server certifying authority chain (SCAC) certificate is obtained by each server whenever the certifying authority invalidates its public key, by:
- contacting the certifying authority using the server's private key for authentication,
- verifying the request by the certifying authority using the server's public key,
- generating the SCAC certificate by the certifying authority using its new private key and forwarding to the said server.

The generating of the said SCAC certificate includes the authentication of the server name and the server public key, old certifying authority public key and certifying authority name.

The certifying authority in case of client will also issue client certificates known as (CCAC) certificates, which will work the same way as (SCAC) certificates. During SSL, handshake when the client presents its certificate, it will also present the CCAC certificate to the server.

In an arrangement of networked server and browser systems conducting secure transactions and including a certifying authority for authenticating such transactions, characterized in that it includes a means for authenticating transactions when the public and private key of the said certifying authority have expired but the authentication certificates of any of server or browser systems is still valid, comprising:
- a means for the server to obtain a certifying authority chain certificate using the new private key of the certifying authority,
- a means for presenting the said certifying authority chain certificate together with the original authentication certificate, to the browser,
- a means for verifying the original authentication certificate using the expired public key of the certifying authority, and verifying the certifying authority chain certificate using the new certifying authority public key by the browser.

The said means for the server to obtain a SCAC certificate from the said certifying authority whenever the said certifying authority withdraws its public key comprising:
- a means for contacting the said certifying authority and requesting certifying authority chain certificate using the server's private key for authentication,
- a means for verification of the request by the certifying authority,
- a means for generating and forwarding the certifying authority chain certificate to the server by the said certifying authority.

The said certifying authority have means to generate the said SCAC certificate containing authentication of the server name and the server public key old certifying authority public key and certifying authority name.

The said certifying authority have also means to issue client certificate known as (CCAC) certificates, which will work the same way as the (SCAC) certificate.

The system includes means to present CCAC certificates to the server during SSL handshake when the client presents its certificate.

BRIEF DESCRIPTION OF THE DRAWINGS

The invention will no be described with reference to the accompanying drawings.

DETAILED DESCRIPTION OF THE DRAWINGS

Figure 1:
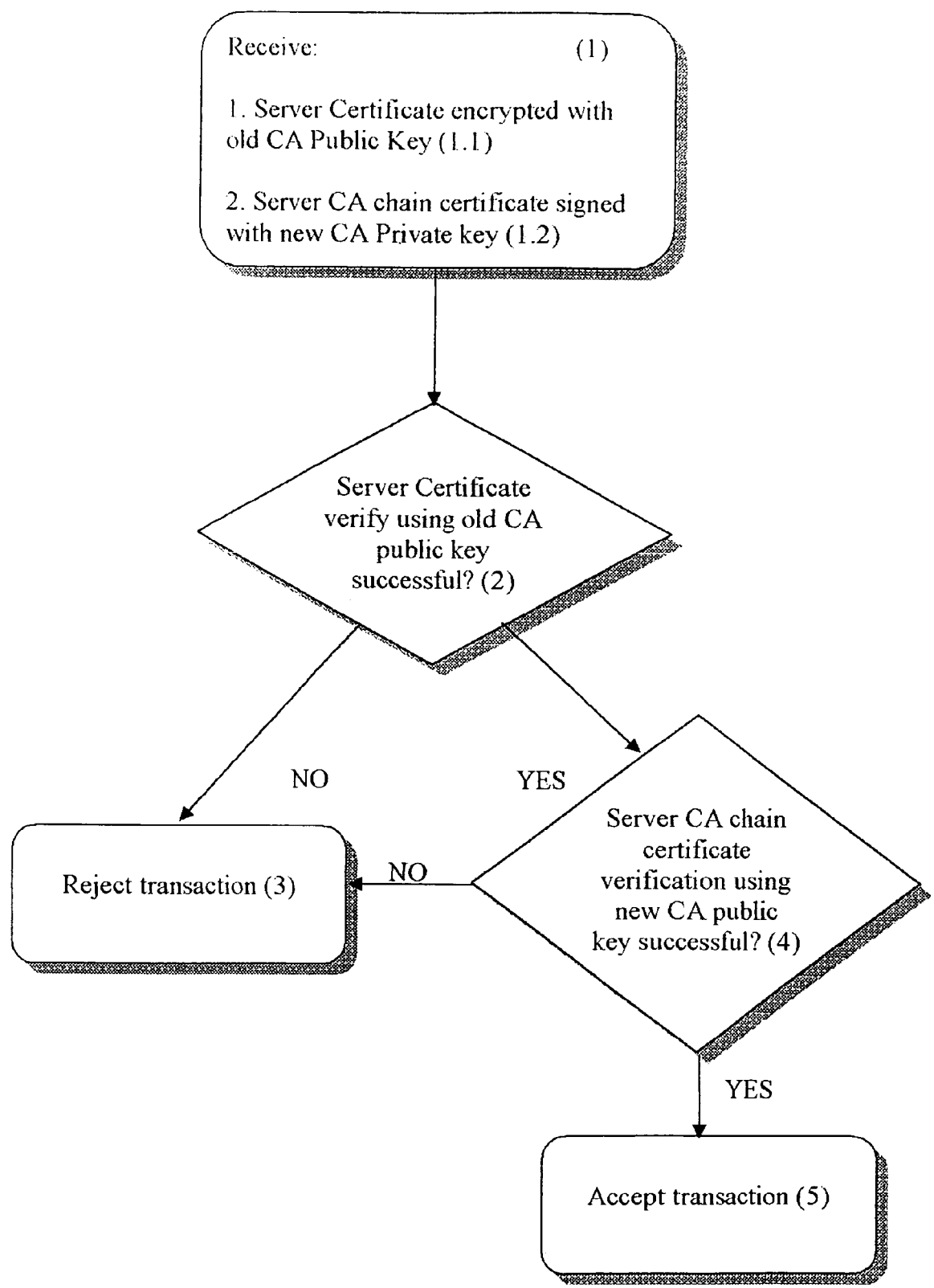
FIG. 1 shows the flow diagram of the method for authenticating the server using the SCAC certificate.

Referring to the drawings, FIG. 1 shows the server presenting the valid server certificate (1.1) encrypted with the old CA public key along with the SCAC certificate (1.2) signed with a new private key, to the browser. The browser verifies the server certificate using the old CA certificate.

If the validation is unsuccessful, the transaction is rejected (3). If the verification is successful, then the browser verifies that SCAC certificate (4) using the mew CA public key. If this verification is unsuccessful, the transaction is rejected (3) but if it is successful, the transaction is accepted (5).

Figure 2:
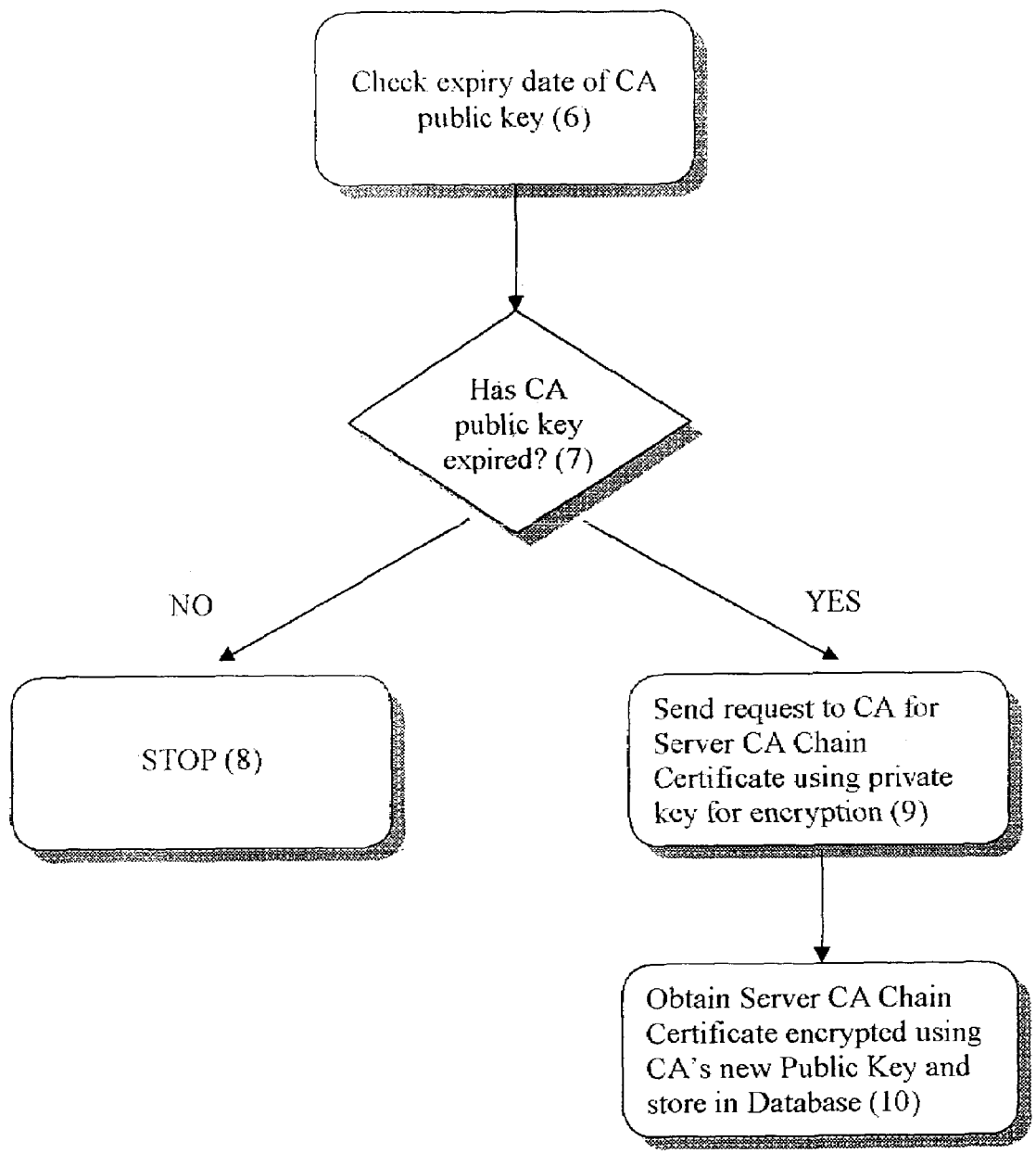
FIG. 2 shows a flow diagram of a method for obtaining SCAC certificate from the certifying authority.

In FIG. 2 the server periodically checks (6 & 7) for the expiry of the certifying authority Public key. If the public key has not expired no further action is required. If however the certifying authority public key has expired. The server sends a request (9) to the certifying authority for issuance of an SCAC certificate. This request is encrypted using the server's private key. The certifying authority verifies the authenticity of the request by checking the request using the server's public key and issues the SCAC certificate (10), if the verification is successful. This SCAC certificate is signed using the certifying authority's new private key.

The above solution can be expanded to have chains of certificates.

The above solution will also work for Client Certificates issued by the CAs and will be known as Client CA Chain Certificates (CCAC) and will work exactly the same way as SCAC Certificates. The Clients can keep track of the expiry of CAs who signed their Certificates, and request for a CCAC Certificate from the CA. The CA will give/generate CCAC certificates for the clients. During SSL Handshake, when the client presents its certificate, it wilt also present the CCAC Certificate to the Server.

Advantages:
1. By using the above method a new certificate is not required.
2. The security is not compromised. If a hacker is able to break the old CA key, he/she will not be able to break the web site certificate as he will not be able to duplicate the New Certificate issued by the new CA Keys.

The invention claimed is:

1. A method for enabling use by a browser of valid authentication certificates in relation to a transaction between the browser and a server when a private key and public key of a certifying authority of the server has expired, comprising:
- receiving an original authentication certificate together with a server certifying authority chain (SCAC) certificate by the browser from the server during a SSL handshake between the browser and the server, said SCAC certificate having been previously obtained by the server from the certifying authority;
- verifying by the browser the original authentication certificate using the expired public key or the certifying authority; and
- verifying by the browser the SCAC certificate using a new public key of the certifying authority.

2. The method of claim 1, wherein the SCAC certificate is obtained by the server whenever the certifying authority invalidates its public key, wherein the certificate is obtained by:

contacting the certifying authority using the server's private key for authentication to make a request for the SCAC certificate;

verifying the request by the certifying authority using the server's public key; and generating the SCAC certificate by the certifying authority using new private key of the certifying authority and forwarding the SCAC certificate to the server.

3. The method of claim 2 wherein generating the SCAC certificate includes authenticating the server name, the server public key, old certifying authority public key, and certifying authority name.

4. The method of claim 1, further comprising issuing by the certifying authority a client (CCAC) certificate, said CCAC certificate being functionally the same as the SCAC certificate subject to the roles of the browser and the server being interchanged.

5. The method of claim 1, wherein the method further comprises presenting the CCAC certificate to the server during the handshake.

6. The method of claim 1, further comprising accepting the transaction by the browser after said verifying the original authentication certificate and after said verifying the SCAC certificate.

7. The method of claim 1, wherein obtaining the SCAC certificate comprises using the new private key of the certifying authority.

* * * * *